US012633670B2

(12) United States Patent
Dou

(10) Patent No.: US 12,633,670 B2
(45) Date of Patent: May 19, 2026

(54) ANTENNA DEVICE

(71) Applicant: Alps Alpine Co., Ltd., Tokyo (JP)

(72) Inventor: Yuanzhu Dou, Miyagi-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 97 days.

(21) Appl. No.: 18/812,448

(22) Filed: Aug. 22, 2024

(65) Prior Publication Data

US 2024/0413541 A1 Dec. 12, 2024

Related U.S. Application Data

(63) Continuation of application No. PCT/JP2022/046600, filed on Dec. 19, 2022.

(30) Foreign Application Priority Data

Mar. 8, 2022 (JP) ................................ 2022-035533

(51) Int. Cl.
*H01Q 15/08* (2006.01)
*H01Q 13/02* (2006.01)

(52) U.S. Cl.
CPC ............ *H01Q 15/08* (2013.01); *H01Q 13/02* (2013.01)

(58) Field of Classification Search
CPC ...... H01Q 15/08; H01Q 13/02; H01Q 19/062; H01Q 13/06; H01Q 19/08
See application file for complete search history.

(56) References Cited

U.S. PATENT DOCUMENTS 3,389,394 A * 6/1968 Lewis ...................... H01Q 5/55 343/753
5,117,240 A * 5/1992 Anderson ............ H01Q 13/025 343/753
5,459,592 A * 10/1995 Shibatani .......... G02F 1/133526 349/5
5,745,082 A * 4/1998 Alder ..................... H01Q 15/22 343/753
(Continued)

FOREIGN PATENT DOCUMENTS

EP 3096400 A1 * 11/2016 ............ H01Q 19/06
JP 2019-054546 4/2019
(Continued)

OTHER PUBLICATIONS

International Search Report from International Application No. PCT/JP2022/046600 dated Mar. 7, 2023, with machine translation.

*Primary Examiner* — Dameon E Levi
*Assistant Examiner* — Jordan E. DeWitt
(74) *Attorney, Agent, or Firm* — Beyer Law Group LLP

(57) ABSTRACT

An antenna device includes: a waveguide; a transmission antenna disposed on the same side as a first opening in the waveguide, the transmission antenna transmitting a radio wave through the waveguide; a reception antenna disposed on the same side as the first opening in the waveguide, the reception antenna receiving a radio wave through the waveguide; and a lens, disposed on the same side as a second opening in the waveguide, through which the radio wave transmitted from the transmission antenna or the radio wave to be received by the reception antenna passes. The first opening has a larger opening area than the second opening. The transmission antenna and reception antenna are placed with an offset from the optic axis of the lens.

10 Claims, 15 Drawing Sheets

(56) References Cited

U.S. PATENT DOCUMENTS

| | | | | |
|---|---|---|---|---|
| 2010/0111475 | A1* | 5/2010 | Lu | B82Y 20/00 156/158 |
| 2011/0205661 | A1* | 8/2011 | Komura | B82Y 20/00 360/59 |
| 2015/0301275 | A1* | 10/2015 | Andle | H01Q 13/0208 385/43 |
| 2018/0164430 | A1 | 6/2018 | Kuriyama et al. | |
| 2019/0310345 | A1* | 10/2019 | Nagaishi | H01Q 21/06 |
| 2020/0112104 | A1* | 4/2020 | Bieti | H01Q 13/06 |
| 2020/0319293 | A1* | 10/2020 | Kuriyama | G01S 13/931 |
| 2020/0403697 | A1* | 12/2020 | Perlot | H04Q 11/0005 |
| 2021/0003783 | A1* | 1/2021 | Cardenas | G02B 6/305 |
| 2021/0143533 | A1* | 5/2021 | Nagaishi | H01Q 1/422 |
| 2024/0271984 | A1* | 8/2024 | Ohlsson | H01Q 19/08 |
| 2024/0413541 | A1* | 12/2024 | Dou | H01Q 13/06 |
| 2025/0266620 | A1* | 8/2025 | Dou | H01Q 15/02 |
| 2025/0309550 | A1* | 10/2025 | Dou | H01Q 15/08 |

FOREIGN PATENT DOCUMENTS

| | | | | | |
|---|---|---|---|---|---|
| JP | 2022175738 | A | * | 11/2022 | |
| WO | WO-9713128 | A1 | * | 4/1997 | G01K 11/006 |
| WO | WO-2025158757 | A1 | * | 7/2025 | H01Q 13/02 |

* cited by examiner

| Name | Theta | Ang | Mag |
|---|---|---|---|
| m1 | 90.0 | 90.0 | 10.5 |
| m2 | 103.0 | 103.0 | 13.2 |

| Name | Theta | Ang | Mag |
|---|---|---|---|
| m3 | 90.0 | 90.0 | 15.3 |
| m4 | 92.0 | 92.0 | 15.5 |

| Name | Phi | Ang | Mag |
|---|---|---|---|
| m1 | 90.0 | 90.0 | 10.5 |
| m2 | 78.0 | 78.0 | 7.4 |
| m3 | 102.0 | 102.0 | 7.5 |

| Name | Phi | Ang | Mag |
|---|---|---|---|
| m1 | 90.0 | 90.0 | 15.3 |
| m2 | 81.5 | 81.5 | 12.1 |
| m3 | 99.0 | 99.0 | 12.1 |

ANTENNA DEVICE

CLAIM OF PRIORITY

This application is a Continuation of International Application No. PCT/JP2022/046600 filed on Dec. 19, 2022, which claims benefit of Japanese Patent Application No. 2022-035533 filed on Mar. 8, 2022. The entire contents of each application noted above are hereby incorporated by reference.

BACKGROUND OF THE INVENTION

1. Field of the Invention

The present disclosure relates to an antenna device.

2. Description of the Related Art

In a conventional sensor having an antenna, the antenna has a substrate, an emission section formed on the substrate, and a waveguide that internally propagates an electromagnetic wave emitted from the emission section so that the electromagnetic wave is directed as a beam. The waveguide has an emission-side opening shaped so that its length in a second direction is longer than the length in a first direction, the first direction and second direction being mutually orthogonal. The waveguide also has an opening formed on a side opposite to the emission-side opening; the emission-side opening is larger than the opening on the opposite side. The opening on the side opposite to the emission-side opening is located so that, on the surface of the substrate, on which the emission section is formed, the edges of the opening on the opposite side incorporate the emission section. A dielectric lens (a type of lens) is provided in the emission-side opening. The direction of the electric field plane of the emission section matches the second direction (see Japanese Unexamined Patent Application Publication No. 2019-054546, for example).

In the antenna (antenna device) in the conventional sensor, the waveguide is such that the emission-side opening is larger than the opening on the side opposite to the emission-side opening, and the emission-side opening is shaped so that its length in the second direction is longer than the length in the first direction, the first direction and second direction being mutually orthogonal. Therefore, the emitted beam is a flat beam having a narrow beam width in the first direction and a wide beam width in the second direction.

To reduce the beam width both overall both in the first direction and in the second direction, the internal size of the waveguide needs to be enlarged and the waveguide consequently needs to be prolonged. When the bore size of the waveguide is enlarged, the lens also needs to be enlarged. As a result, the size of the antenna device becomes large.

SUMMARY OF THE INVENTION

In view of this, the present disclosure provides a small-sized antenna device with a narrow beam width.

An antenna device in an embodiment of the present disclosure includes: a waveguide; a transmission antenna disposed on the same side as a first opening in the waveguide, the transmission antenna transmitting a radio wave through the waveguide; a reception antenna disposed on the same side as the first opening in the waveguide, the reception antenna receiving a radio wave through the waveguide; and a lens, disposed on the same side as a second opening in the waveguide, through which the radio wave transmitted from the transmission antenna or the radio wave to be received by the reception antenna passes. The first opening has a larger opening area than the second opening. The transmission antenna and reception antenna are placed with an offset from the optic axis of the lens.

In accordance with present invention, a small-sized antenna device with a narrow beam width can be provided.

DESCRIPTION OF THE PREFERRED EMBODIMENTS

An embodiment to which an antenna device in the present disclosure is applied will be described below.

Embodiment

<Structure of Antenna Device 100>

Figure 1A:
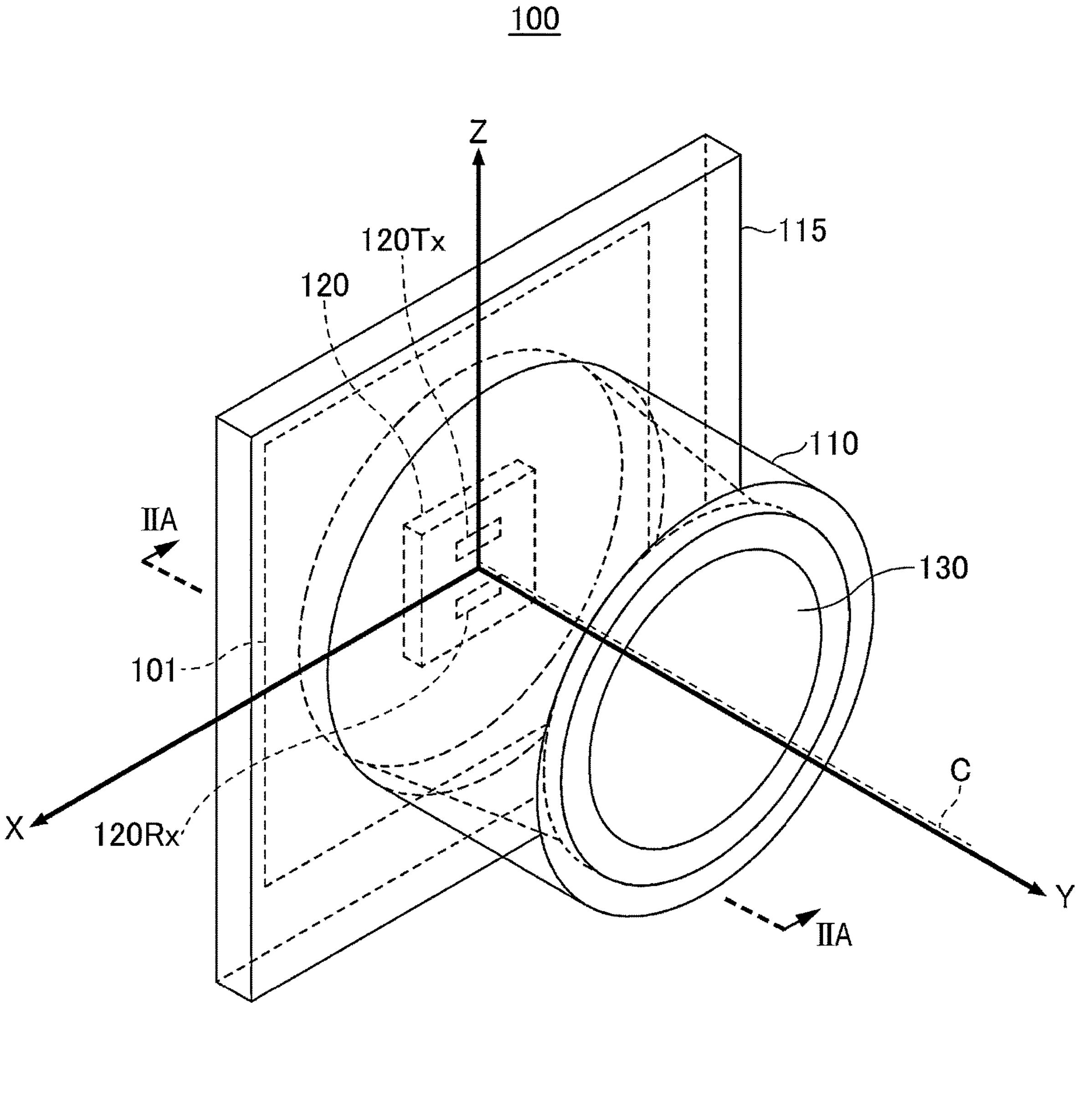
FIG. 1A illustrates an antenna device in accordance with one embodiment of the present invention.
Figure 1B:
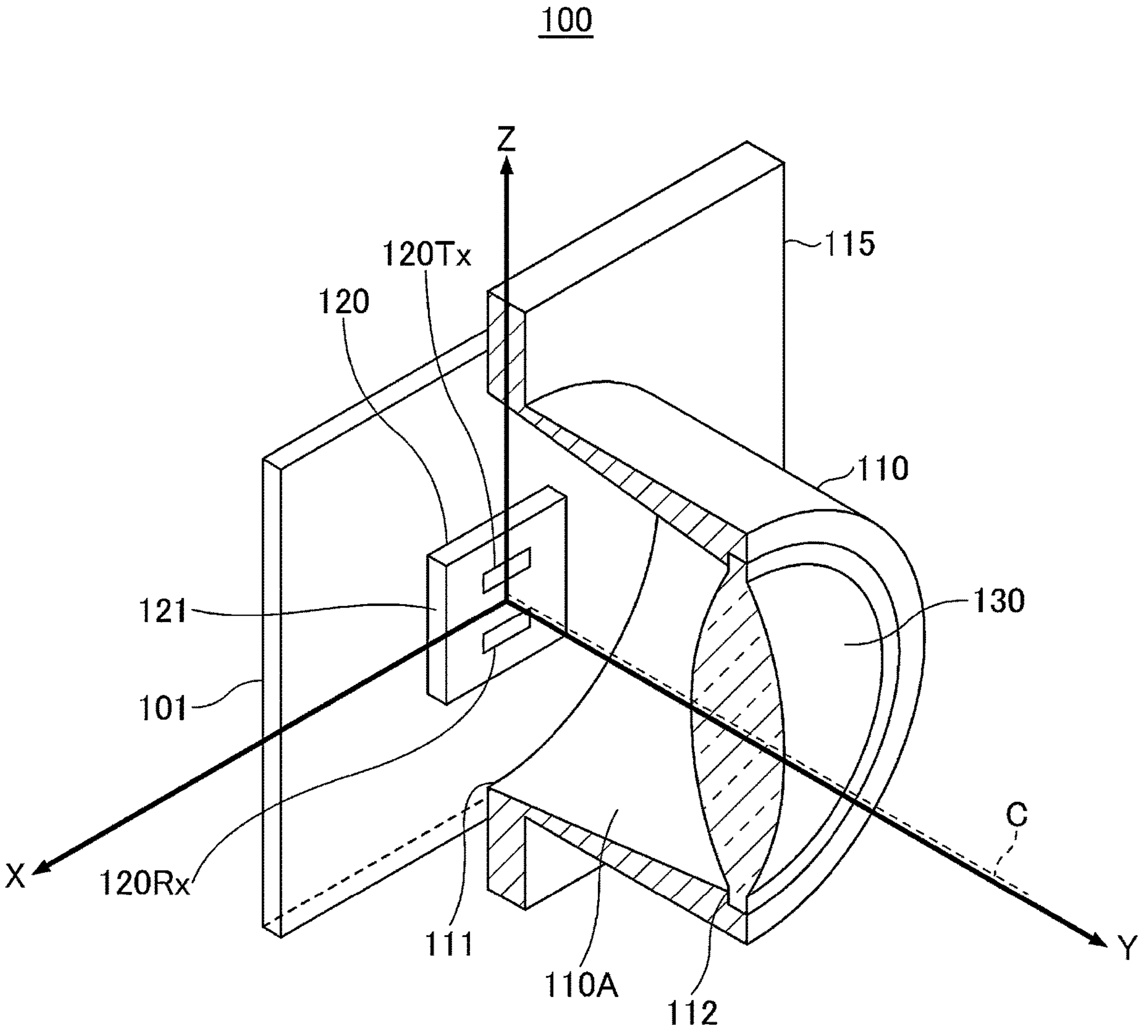
FIG. 1B illustrates a partial sectional view of the antenna device in accordance with one embodiment of the present invention.
Figure 2A:
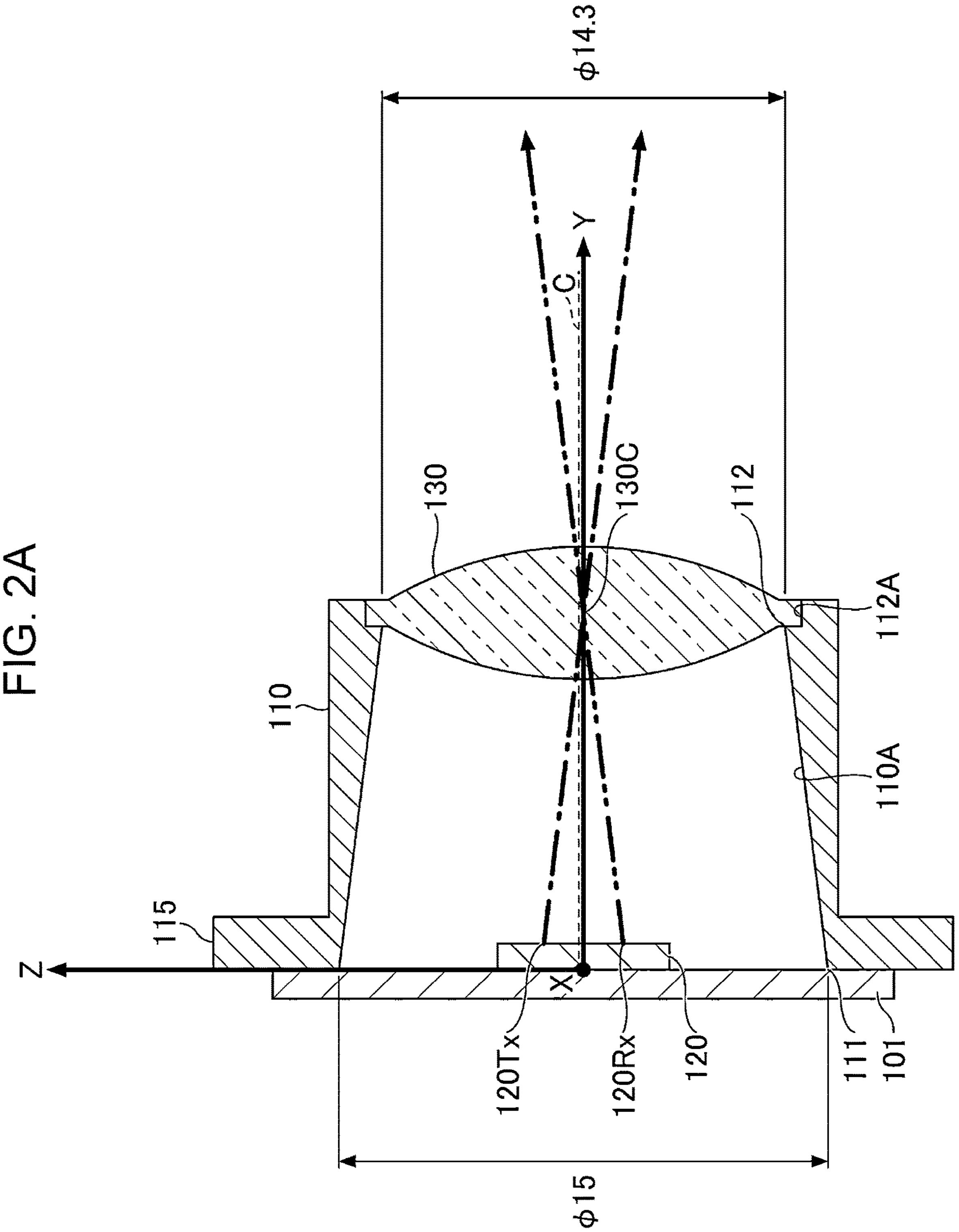
FIG. 2A is a cross-sectional view taken along line IIA-IIA in FIG. 1A.
Figure 2B:
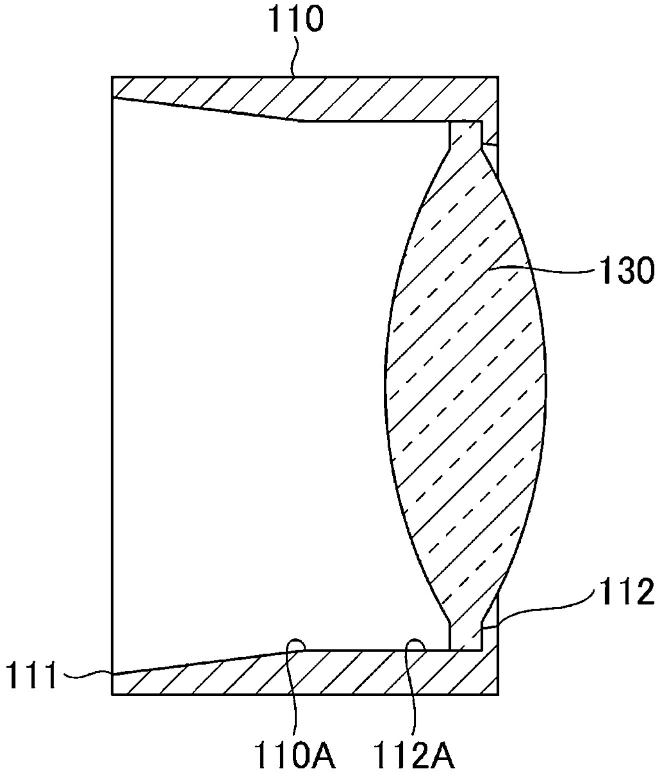
FIG. 2B illustrates a variation of the structure of the cross section in FIG. 2A.

FIGS. 1A and 1B illustrate the antenna device 100 in an embodiment. FIG. 1A is a perspective view, and FIG. 1B illustrates part of the antenna device 100 as a half sectional view. FIG. 2A is a sectional view taken along line IIA-IIA in FIG. 1A. Specifically, FIG. 2A illustrates a cross section of a waveguide 110 as taken along a YZ plane including the optic axis of a lens 130. FIG. 2B illustrates a variation of the structure of the cross section in FIG. 2A. Unless otherwise noted, the structure of the antenna device 100 will be described below with reference to FIGS. 1A, 1B, and 2A.

The description below is based on an XYZ coordinate system. For convenience of explanation, the −Z-direction side will be referred to below as the downward side or "downward", and the +Z-direction side will be referred to below as the upward side or "upward". However, these directions do not represent a universal up-down relationship. Viewing an XZ plane will refer to plan view.

The antenna device 100 includes a substrate 101, the waveguide 110, a transmission and reception section 120, and the lens 130. The antenna device 100, which transmits and receives radio waves, focuses a transmission wave into a beam through the lens 130, and also focuses a to-be-received beam through the lens 130.

A radio wave transmitted or received by the antenna device 100 is a radio wave in an extremely high frequency band, as an example. An extremely high frequency wave is in a frequency band of 30 GHz to 300 GHz. It behaves substantially like light. However, a radio wave transmitted or received by the antenna device 100 may be a radio wave at a frequency in a frequency band other than an extremely high frequency band.

The substrate 101 is a board on which the transmission and reception section 120 is mounted. A wiring board complying with the Flame Retardant Type 4 (FR-4) standard can be used as the substrate 101, as an example. The substrate 101 is fixed on the −Y-direction side of the waveguide 110.

The waveguide 110 is a hollow circular waveguide in a cylindrical shape, as an example. The waveguide 110 has an inner wall surface 110A, an opening 111, an opening 112, and an attachment portion 115. The interior of the waveguide 110 is a waveguide path, through which a radio wave propagates. The opening 111 is an example of a first opening. The opening 112 is an example of a second opening. The −Y-direction side of the waveguide 110 is an example of a first opening side. The +Y-direction side of the waveguide 110 is an example of a second opening side.

In FIGS. 1A, 1B, and 2A, the origin of the XYZ coordinate system matches the center of the opening 111, and the central axis C of the waveguide 110 matches the Y axis. The central axis C matches the optic axis of the lens 130.

The inner wall surface 110A is the inner wall of the waveguide 110, which is a hollow tube in a cylindrical shape. With the waveguide 110, the opening 111 has a larger opening diameter than the opening 112, so the waveguide 110 is a cylinder in a truncated cone shape the opening diameter of which is reduced in a direction from the opening 111 toward the opening 112. Therefore, the inner wall surface 110A is in a truncated cone shape. When the opening 111 has a larger opening diameter than the opening 112, this means that the opening 111 has a larger opening area than the opening 112. The angle of the inner wall surface 110A and its other details will be described later with reference to FIG. 3.

The opening 111 is located at an end of the waveguide 110 on the −Y-direction side. The opening 111 is circular in plan view. The opening diameter of the opening 111, which is larger than the opening diameter of the opening 112 as described above, is 15 mm (φ15 mm) as an example.

The opening 112 is located at an end of the waveguide 110 on the +Y-direction side. Strictly, the opening 112 is offset in the −Y direction from the end of the waveguide 110 on the +Y-direction side by an amount equal to the depth of a step 112A (see FIG. 2A). Since a range in which the waveguide 110 functions as a waveguide through which a radio wave propagates is between the opening 111 and the opening 112, however, the description below assumes that the opening 112 is located at the end of the waveguide 110 on the +Y-direction side. Consequently, the step 112A may be handled as protruding from the end of the waveguide 110 on the +Y-direction side further toward the +Y-direction side.

The opening 112 is circular in plan view. The opening diameter of the opening 112, which is smaller than the opening diameter of the opening 111, is 14.3 mm (φ14.3 mm) as an example. As illustrated in FIG. 2A, the step 112A is formed in the opening 112 so that the lens 130 is attached to the opening 112. The lens 130 is attached to the waveguide 110 from the +Y-direction side.

The step 112A may be formed more on the −Y-direction side than is the opening 112, as illustrated in FIG. 2B. In this structure, the lens 130 is attached from the same side as the opening 111 in the waveguide 110 through its interior.

At the end of the waveguide 110 on the −Y-direction side, the attachment portion 115 extends toward the outside in plan view. The attachment portion 115 has outer edges in a square shape in plan view, as an example. The attachment portion 115 is provided to attach the substrate 101 to the waveguide 110.

In a state in which the lens 130 is attached to the waveguide 110 as described above, the focus of the lens 130 is positioned at the center of the opening 111 in plan view. That is, the length of the central axis C of the waveguide 110 in the direction in which the central axis C extends is set so that the focus of the lens 130 is positioned on the opening plane of the opening 111.

The transmission and reception section 120 is mounted on a surface of the substrate 101 on the +Y-direction side. The transmission and reception section 120 has a substrate 121, a transmission antenna 120Tx, and a reception antenna 120Rx. The substrate 121 is smaller than the substrate 101 in plan view, and is square as an example. The substrate 121 is disposed so as to be positioned at the central portion of the opening 111 in plan view. Specifically, the substrate 121 is placed so that its center is positioned on the central axis C in plan view.

The transmission antenna 120Tx and reception antenna 120Rx are disposed on the surface of the substrate 121 on the +Y-direction side with a spacing between them in the Z direction. The transmission antenna 120Tx and reception antenna 120Rx have the same shape and the same size, as an example. The transmission antenna 120Tx transmits a radio wave through the waveguide 110. The reception antenna 120Rx receives a radio wave through the waveguide 110.

The transmission antenna 120Tx and reception antenna 120Rx are placed so as to be point-symmetric with respect to the central axis C in plan view. A plan view of the transmission antenna 120Tx and reception antenna 120Rx refers to the transmission antenna 120Tx and reception antenna 120Rx being viewed from the opening plane of the opening 111.

When the transmission antenna 120Tx and reception antenna 120Rx are point-symmetric with respect to the central axis C in plan view, this means that the center of the transmission antenna 120Tx in plan view and the center of the reception antenna 120Rx in plan view are placed so as to be point-symmetric with respect to the central axis C in plan view. Both the center of the transmission antenna 120Tx in plan view and the center of the reception antenna 120Rx in plan view are on the Z axis. Since the central axis C matches the optic axis of the lens 130, the transmission antenna 120Tx and reception antenna 120Rx are placed with an offset from the optic axis of the lens 130.

Since both the center of the transmission antenna 120Tx in plan view and the center of the reception antenna 120Rx in plan view are on the Z axis and are placed so as to be point-symmetric with respect to the central axis C in plan view, this means that the transmission antenna 120Tx and reception antenna 120Rx are placed so as to be point-symmetric with respect to the central axis C on a cross section of the waveguide 110 as taken along a YZ plane including the optic axis of the lens 130.

Since both the transmission antenna 120Tx and the reception antenna 120Rx cannot be placed on the central axis C (that is, the optic axis of the lens 130), the transmission antenna 120Tx and reception antenna 120Rx are placed as described above to make a match between the transmission characteristics of the transmission antenna 120Tx and the reception characteristics of the reception antenna 120Rx. The transmission antenna 120Tx and reception antenna 120Rx can be implemented by, for example, a loop antenna, a patch antenna, a mono-pole antenna, a di-pole antenna, or the like.

Since the length of the central axis C of the waveguide 110 in the direction in which the central axis C extends is set so that the focus of the lens 130 is positioned on the opening plane of the opening 111, the position of the transmission antenna 120Tx and reception antenna 120Rx in the direction in which the optic axis of the lens 130 (that is, the central axis C of the waveguide 110) extends may match the focus position of the lens 130.

On the cross section illustrated in FIG. 2A, the cross section being parallel to a YZ plane including the optic axis of the lens 130, a line connecting the center of the transmission antenna 120Tx and the center 130C of the lens 130 together is indicated by a dash-dot line; and a line connecting the center of the reception antenna 120Rx and the center 130C of the lens 130 together is indicated by a dash-dot-dot line. Since the transmission antenna 120Tx and reception antenna 120Rx are placed with an offset from the optic axis of the lens 130, there is no match between the line connecting the center of the transmission antenna 120Tx and the center 130C of the lens 130 together and the line connecting the center of the reception antenna 120Rx and the center 130C of the lens 130 together. The intensity of a radio wave emitted from the transmission antenna 120Tx is the highest in the direction in which the center of the transmission antenna 120Tx and the center 130C of the lens 130 are connected together. The intensity of a radio wave received by the reception antenna 120Rx is the highest in the direction in which the center of the reception antenna 120Rx and the center 130C of the lens 130 are connected together.

The lens 130 only needs to be capable of bi-directionally focusing a radio wave transmitted by the transmission antenna 120Tx and a radio wave to be received by the reception antenna 120Rx. The lens 130 may be a circular double-convex lens in plan view, as an example. However, the lens 130 may be a single-convex lens. A double-convex lens and a single-convex lens are each an example of a convex lens. Although the lens 130 may be a flat lens such as a flat lens having a Fresnel zone or a flat lens including a meta-material, an aspect in which a double-convex lens is used will be described below.

<Details of Inner Wall Surface 110A of Waveguide 110>

Figure 3:
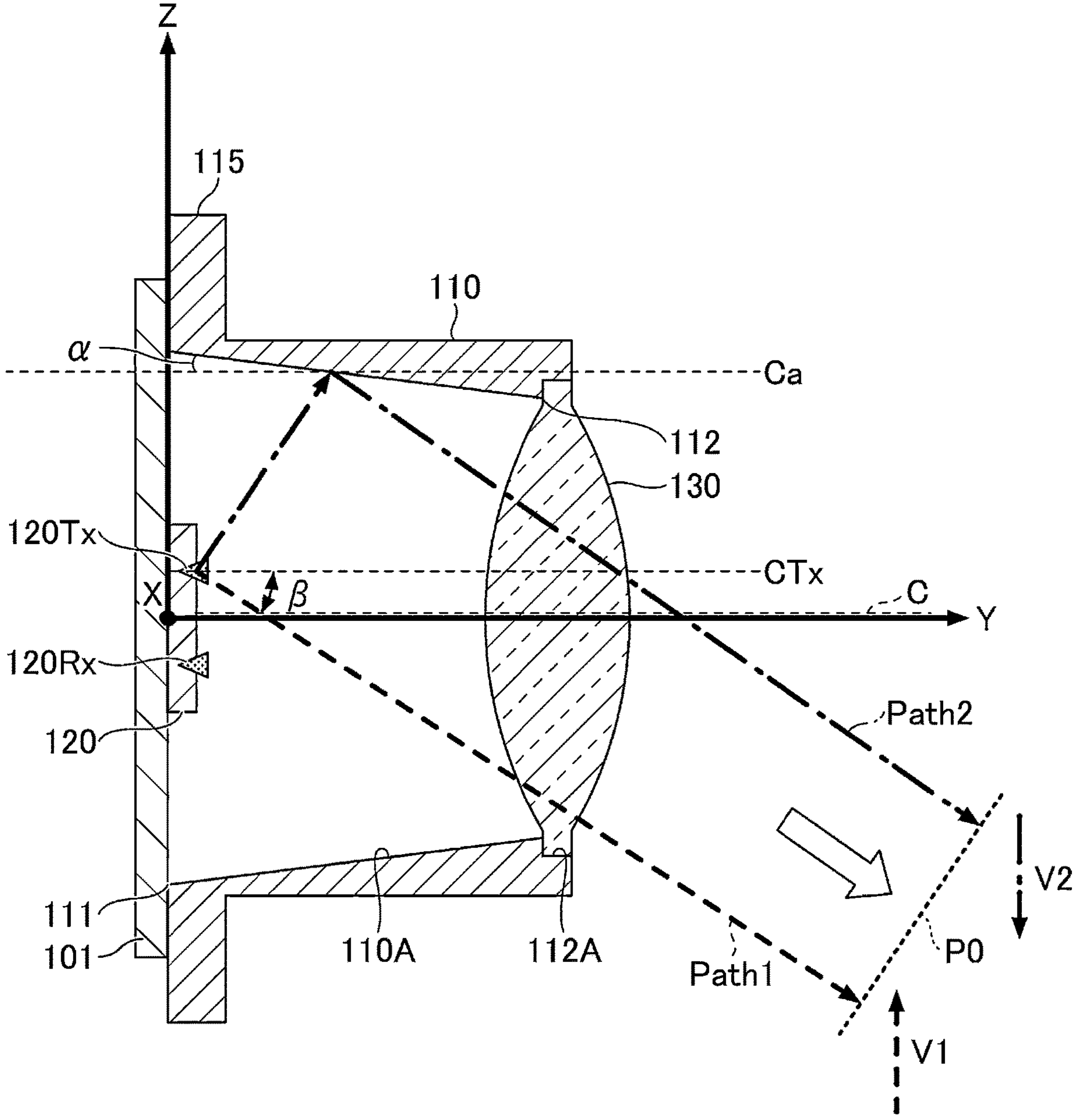
FIG. 3 illustrates the inner wall surface of a waveguide in detail.

FIG. 3 illustrates the inner wall surface 110A of the waveguide 110 in detail. Specifically, FIG. 3 illustrates a cross section of the waveguide 110 as taken along a YZ plane including the optic axis of the lens 130, as in FIGS. 2A and 2B.

An angle α illustrated in FIG. 3 will now be described, which is formed on a cross section of the waveguide 110 as taken along a YZ plane including the optic axis of the lens 130 between the inner wall surface 110A of the waveguide 110 and the optic axis of the lens 130 (that is, the central axis C of the waveguide 110). The angle α, which is formed on the cross section illustrated in FIG. 3 between the inner wall surface 110A and the optic axis of the lens 130 (that is, the central axis C of the waveguide 110), is indicated as the positive value of a clockwise angle when a cross section parallel to a YZ plane is viewed from the +X-direction side toward the −X-direction side, as an example. In FIG. 3, an axis Ca parallel to the optic axis of the lens 130 (that is, the central axis C of the waveguide 110) is illustrated to indicate the angle α.

The angle α is the inclination of the inner wall surface 110A with respect to the central axis C of the waveguide 110. Since the opening 111 has a larger opening area than the opening 112 and the inclination angle of the inner wall surface 110A is fixed between the opening 111 and the opening 112, the inner wall surface 110A is inclined so as to face the opening 111 with respect to the central axis C. Therefore, when a radio wave is emitted from the transmission antenna 120Tx and is then reflected by the inner wall surface 110A, the radio wave is directed toward the central axis C.

That is, radio waves emitted from the transmission antenna 120Tx propagate in two propagation paths, one of which is a propagation path Path1 (indicated by the dashed line), through which a radio wave directly enters the lens 130, and the other of which is a propagation path Path2 (indicated by the dash-dot line), through which a radio wave is reflected toward the central axis C by the inner wall surface 110A and then enters the lens 130.

When radios wave propagate from the lens 130 toward the reception antenna 120Rx, they similarly propagate in two propagation paths, one of which is a propagation path through which a radio wave directly enters the reception antenna 120Rx from the lens 130, and the other of which is a propagation path through which a radio wave is reflected toward the central axis C by the inner wall surface 110A and then enters the reception antenna 120Rx.

The angle α may be set to a predetermined angle by which an emitted electric field V1 and an emitted electric field V2 have mutually opposite phases: the emitted electric field V1 is at the propagation path Path1 (indicated by the dashed line), through which a radio wave, which is part of radio waves that directly enter the lens 130 from the transmission antenna 120Tx, enters a portion, of the lens 130, that is more on the outer side than is the central portion of the lens 130 because a beam angle β is comparatively large as illustrated in FIG. 3; and the emitted electric field V2 is at the propagation path Path2 (indicated by the dash-dot line), through which a radio wave emitted from the transmission antenna 120Tx is reflected by the inner wall surface 110A and then enters the lens 130. The emitted electric field V1 and emitted electric field V2 have mutually opposite phases on a plane P0 perpendicular to the propagation path Path1 and propagation path Path2 in a range in which the angle α is the predetermined angle. The beam angle β formed by a radio wave emitted from the transmission antenna 120Tx is an angle with respect to an axis CTx, which passes through the center of the transmission antenna 120Tx and is parallel to the central axis C.

When the angle of the propagation path Path1 with respect to the optic axis of the lens 130 (that is, the central axis C of the waveguide 110), the angle being an emission angle, is large, a beam emitted through the lens 130 in the +Y direction has a wide beam width. In view of this, the emitted electric field V1 and emitted electric field V2 are arranged so as to have mutually opposite phases, so a direct wave passing through the propagation path Path1 forming a large emission angle and a reflected wave passing through the propagation path Path2 are canceled out (mutually weakened) to reduce the beam width. Next, a condition under which the emitted electric field V1 and emitted electric field V2 have mutually opposite phases will be described in detail.

<Condition Under which Emitted Electric Field V1 and Emitted Electric Field V2 have Mutually Opposite Phases>

Figure 4A:
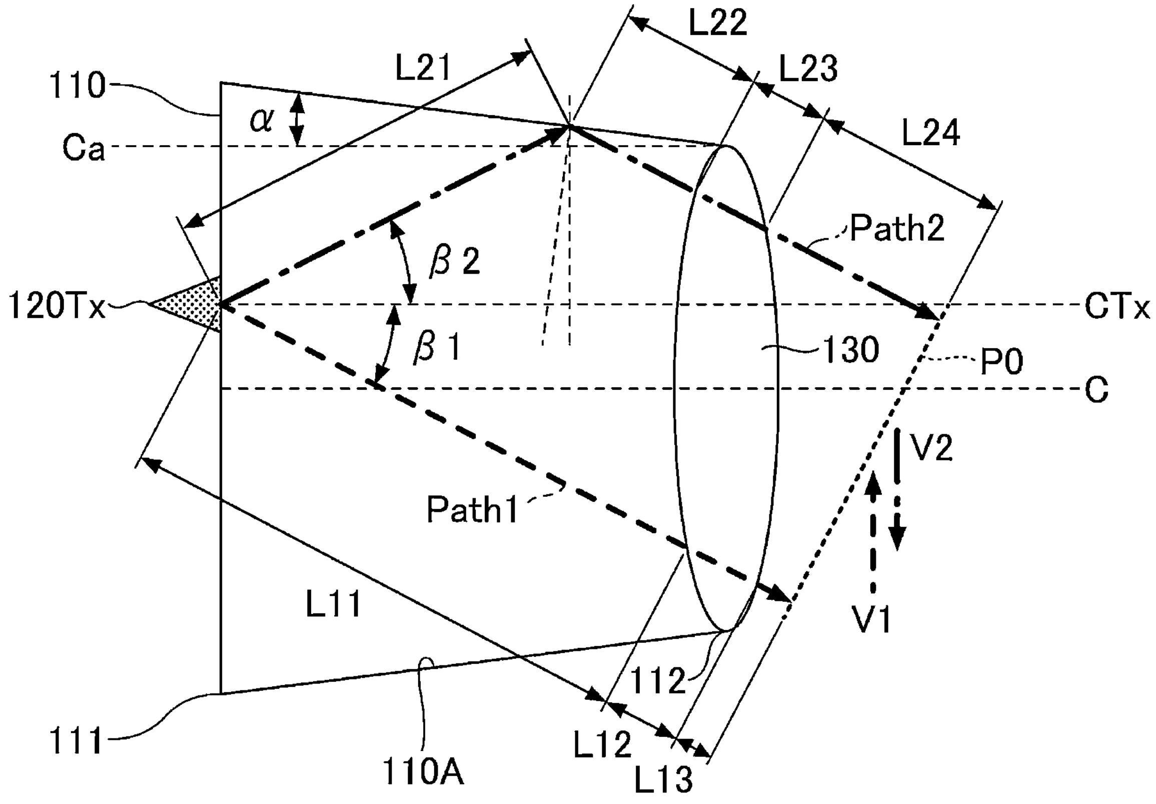
FIG. 4A illustrates a condition under which an emitted electric field and another emitted electric field have mutually opposite phases.

FIG. 4A illustrates a condition under which the emitted electric field V1 and emitted electric field V2 have mutually opposite phases. Specifically, FIG. 4A schematically illustrates the structure of the waveguide 110 on a cross section taken along a YZ plane including the optic axis of the lens 130, as in FIGS. 2A, 2B, and 3.

As described above, the transmission antenna 120Tx and reception antenna 120Rx are placed so as to be point-symmetric with respect to the central axis C on a cross section of the waveguide 110 as taken along a YZ plane including the optic axis of the lens 130, so the description below will focus on the transmission antenna 120Tx. However, the description below is also true for the reception antenna 120Rx. In FIG. 4A, the axis CTx, which passes through the center of the transmission antenna 120Tx and is parallel to the central axis C, is also illustrated besides the axis Ca, with respect to which the angle α is formed.

An angle formed between the axis CTx and the propagation path Path1 (indicated by the dashed line), through which a radio wave directly enters the lens 130 from the transmission antenna 120Tx will be denoted by β1. An angle formed between the axis CTx and the propagation path Path2, through which a radio wave emitted from the transmission antenna 120Tx is reflected by the inner wall surface 110A and then enters the lens 130 will be denoted by β2. Then, Equation (1) below holds. The angle β1 takes a positive value in the counterclockwise direction around the axis CTx. The angle 2 takes a positive value in the clockwise direction around the axis CTx.

$$\beta 1 = \beta 2 + 2\alpha \tag{1}$$

When the angle β1 is small, the propagation path Path1 contributes to reducing the beam width of a beam emitted through the lens 130 in the +Y direction. When the angle 1 is large, however, the propagation path Path1 causes the beam width to be widened. Therefore, when a radio wave for which the angle β1 is comparatively large is concerned, if the condition is satisfied under which the emitted electric field V1 and emitted electric field V2 have mutually opposite phases on the plane P0, the radio wave for which the angle β1 is comparatively large can be canceled out with (weakened by) the reflected wave. As a result, the intensity of the radio wave for which the angle β1 is comparatively small can be relatively increased, enabling a beam to be formed by a radio wave for which the angle β1 is comparatively small.

Now, the length of a segment, which is part of the propagation path Path1, from the transmission antenna 120Tx to a surface of the lens 130 on the −Y-direction side will be denoted by L11; the length of a segment, which is part of the propagation path Path1, in the lens 130 will be denoted by L12; and the length of a segment, which is part of the propagation path Path1, from a surface of the lens 130 on the +Y-direction side to the plane P0 will be denoted by L13.

Similarly, the length of a segment, which is part of the propagation path Path2, from the transmission antenna 120Tx to the inner wall surface 110A will be denoted by L21; the length of a segment, which is part of the propagation path Path2, from the inner wall surface 110A to the surface of the lens 130 on the −Y-direction side will be denoted by L22; the length of a segment, which is part of the propagation path Path2, in the lens 130 will be denoted by L23; and the length of a segment, which is part of the propagation path Path2, from the surface of the lens 130 on the +Y-direction side to the plane P0 will be denoted by L24. Then, Equation (2) below holds for the lengths L11, L12, L13, L21, L22, L23, and L24. In Equation (2), A is the length of a radio wave transmitted by the transmission antenna 120Tx and εr is the dielectric constant of the material of the lens 130.

$$L11 + L12 \times \sqrt{\varepsilon r} + \lambda/2 + L13 = L21 + L22 + L23 \times \sqrt{\varepsilon r} + L24 \tag{2}$$

Therefore, it suffices to set the angle α between the optic axis of the lens 130 (that is, the central axis C of the waveguide 110) and the inner wall surface 110A of the waveguide 110 so that Equation (2) is satisfied. The angle α of this type may be greater than 0 degrees and smaller than or equal to 45 degrees (0<α≤) 45°, as an example.

<Propagation Paths in Comparative Waveguide>

Figure 4B:
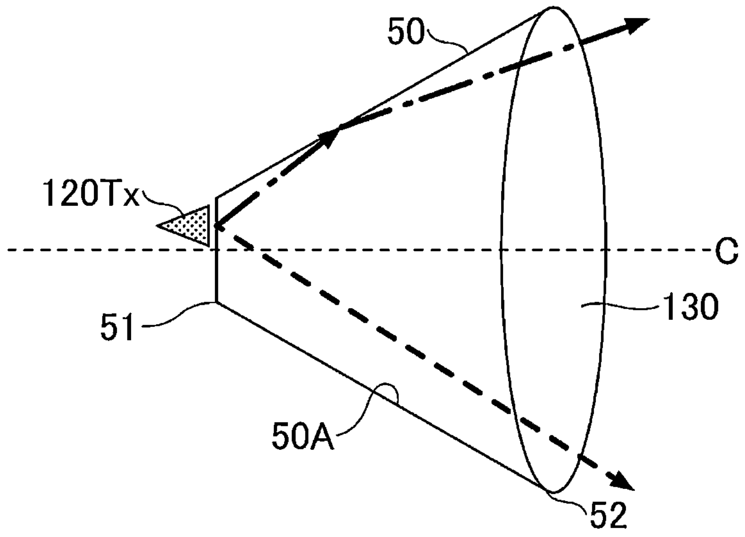
FIG. 4B illustrates propagation paths in a comparative waveguide.

FIG. 4B illustrates propagation paths in a comparative waveguide 50. In the comparative waveguide 50 in FIG. 4B, an opening 52 formed on the same side as the lens 130 has a larger opening area than an opening 51 formed on the same side as the transmission antenna 120Tx. Therefore, a propagation path (indicated by the dash-dot line) through which a radio wave emitted from the transmission antenna 120Tx is reflected by an inner wall 50A and then the reflected wave enters the lens 130 does not cross a propagation path (indicated by the dashed line) through which a radio wave emitted from the transmission antenna 120Tx directly enters the lens 130.

That is, when the opening 52 formed on the same side as the lens 130 has a larger opening area than the opening 51 formed on the same side as the transmission antenna 120Tx as in the comparative waveguide 50, the direct wave and reflected wave are not canceled out with each other, in which case the beam angle of a beam emitted from the lens 130 is increased.

Figure 4C:
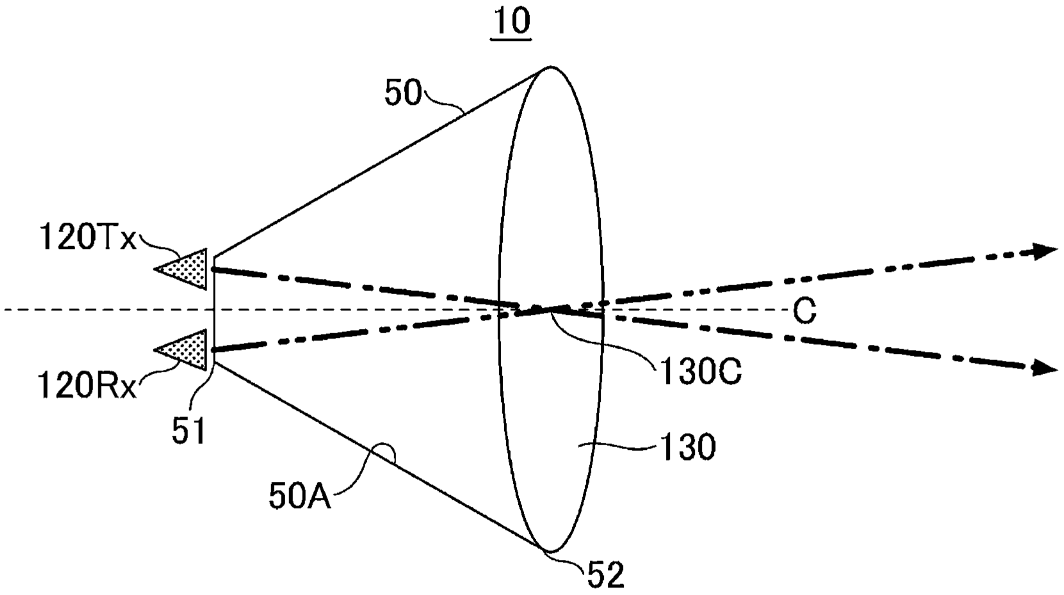
FIG. 4C illustrates the direction in which the intensity of a radio wave becomes the highest in a comparative antenna device including the comparative waveguide.

FIG. 4C illustrates the direction in which the intensity of a radio wave becomes the highest in a comparative antenna device 10 including the comparative waveguide 50. In the comparative antenna device 10, the intensity of a radio wave emitted from the transmission antenna 120Tx is the highest in the direction (indicated by the dash-dot line) in which the center of the transmission antenna 120Tx and the center 130C of the lens 130 are connected together, and the intensity of a radio wave received by the reception antenna 120Rx is the highest in the direction (indicated by the dash-dot-dot line) in which the center of the reception antenna 120Rx and the center 130C of the lens 130 are connected together, as in the antenna device 100, described with reference to FIG. 2A, in the embodiment. Since the transmission antenna 120Tx and reception antenna 120Rx are placed with an offset from the optic axis of the lens 130, there is no match between the line connecting the center of the transmission antenna 120Tx and the center 130C of the lens 130 together and the line connecting the center of the reception antenna 120Rx and the center 130C of the lens 130 together.

<Simulation Results for Beam Width>

Figure 5A:
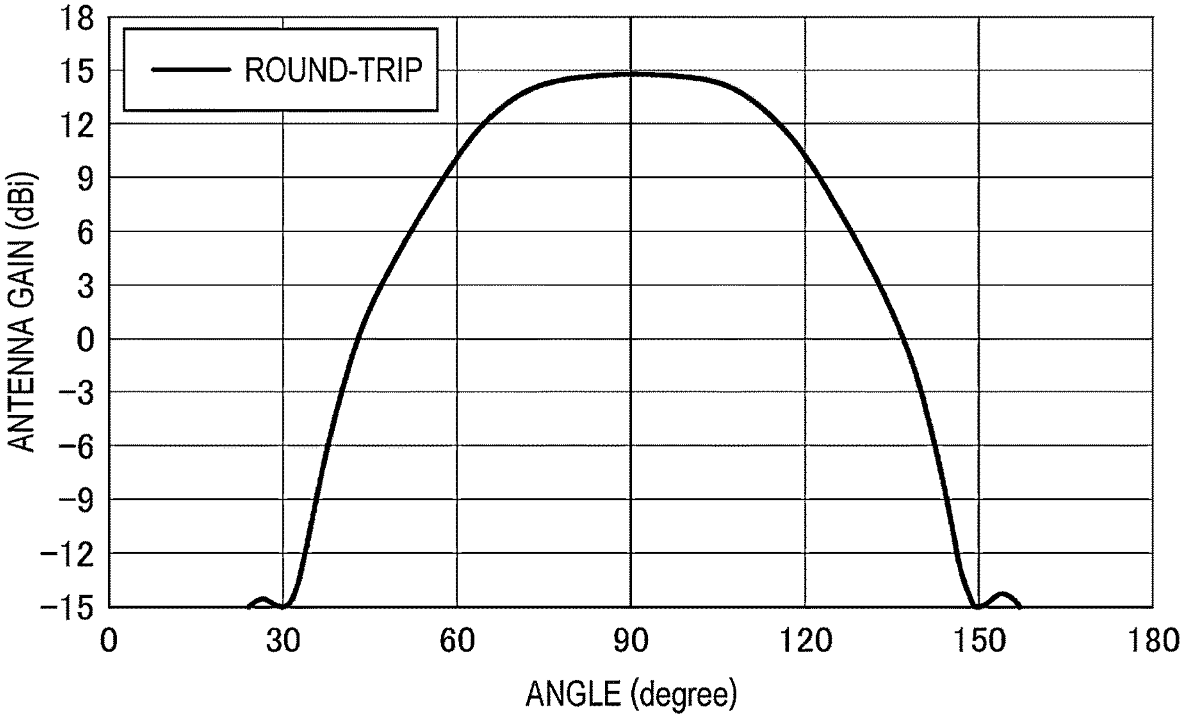
FIG. 5A illustrates simulation results for the beam width of a round-trip beam in the comparative antenna device including the comparative waveguide.

FIG. 5A illustrates simulation results for the beam width of a round-trip beam in the antenna device 10 (see FIG. 4C) including the comparative waveguide 50. In FIG. 5A, the horizontal axis represents beam angle (in degrees) on a YZ plane including the optic axis of the lens 130. A direction at a beam angle of 90 degrees is the +Y direction from the origin of the XYZ coordinate system. A direction at a beam angle of 0 degrees is the +Z direction from the origin of the XYZ coordinate system. A direction at a beam angle of 180 degrees is the −Z direction from the origin of the XYZ coordinate system. The vertical axis represents antenna gain (in dBi). A study was made for a beam width obtained in a beam angle range from the maximum value of antenna gain to 3 dB less, that is, for a 3-dB beam width.

The round-trip antenna gain in FIG. 5A is the sum of the antenna gain of a transmission beam Tx transmitted from the transmission antenna 120Tx of the comparative antenna device 10 and the antenna gain of a reception beam Rx received by the reception antenna 120Rx of the comparative antenna device 10.

The 3-dB beam width of the round-trip antenna gain was in the range of about 65 degrees to about 115 degrees, which was from about −25 degrees to about +25 degrees with respect to the front direction at 90 degrees. Thus, with the comparative antenna device 10 (see FIG. 4C) including the comparative waveguide 50, it was found that the beam angle is large and the beam width is wide.

Figure 5B:
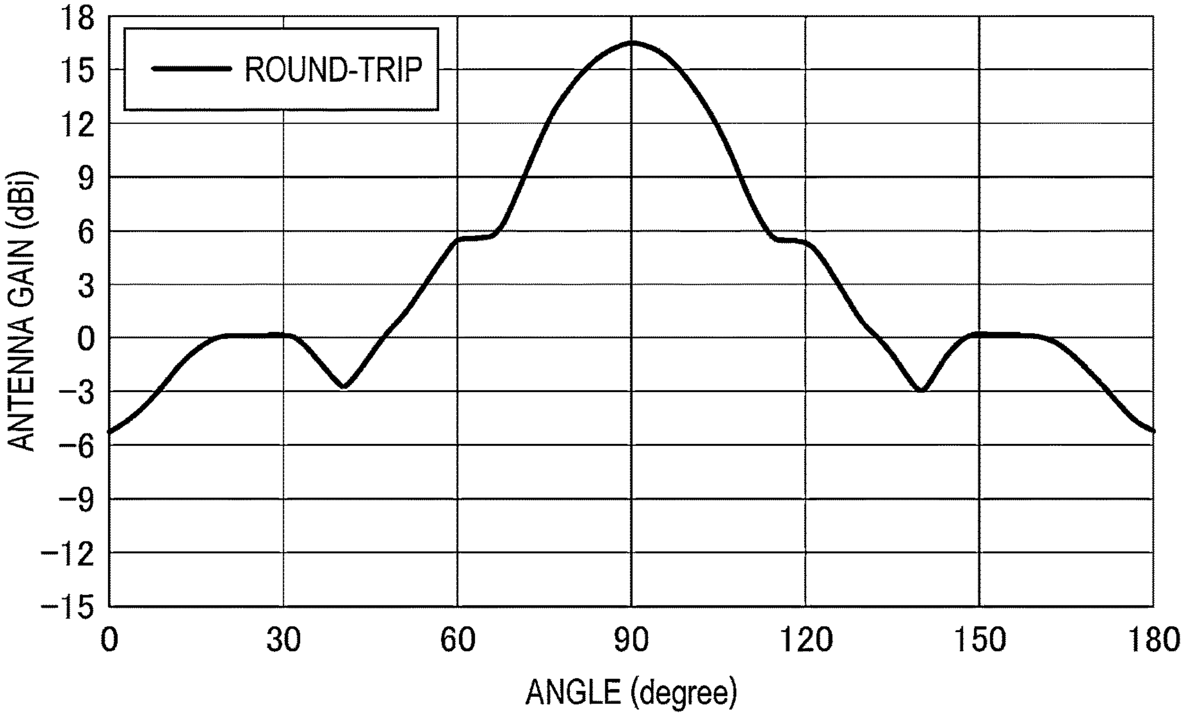
FIG. 5B illustrates simulation results for the beam width of a round-trip beam in the antenna device in accordance with one embodiment.

FIG. 5B illustrates simulation results for the beam width of a round-trip beam in the antenna device 100 in the embodiment. The horizontal axis and vertical axis in FIG. 5B are identical to the horizontal axis and vertical axis in FIG. 5A. The beam width in a study described below was 3 dB beam, as in FIG. 5A.

The round-trip antenna gain in FIG. 5B is the sum of the antenna gain of a transmission beam Tx transmitted from the transmission antenna 120Tx of the antenna device 100 in the embodiment and the antenna gain of a reception beam Rx received by the reception antenna 120Rx of the antenna device 100 in the embodiment.

The 3-dB beam width of the round-trip antenna gain was in the range of about 76.5 degrees to about 103.5 degrees, which was from about −13.5 degrees to about +13.5 degrees with respect to the front direction at 90 degrees. Thus, with the antenna device 100 in the embodiment, it was found that the beam angles at both ends of the 3-dB beam width are reduced to about a half and the beam width is reduced to about a half, when compared with the antenna device 10 (see FIG. 4C) including the comparative waveguide 50. A possible reason for this is the effect obtained by canceling out a component with a large beam angle.

<Simulation Results for Emission Pattern (on YZ-Plane)>

Figure 6A:
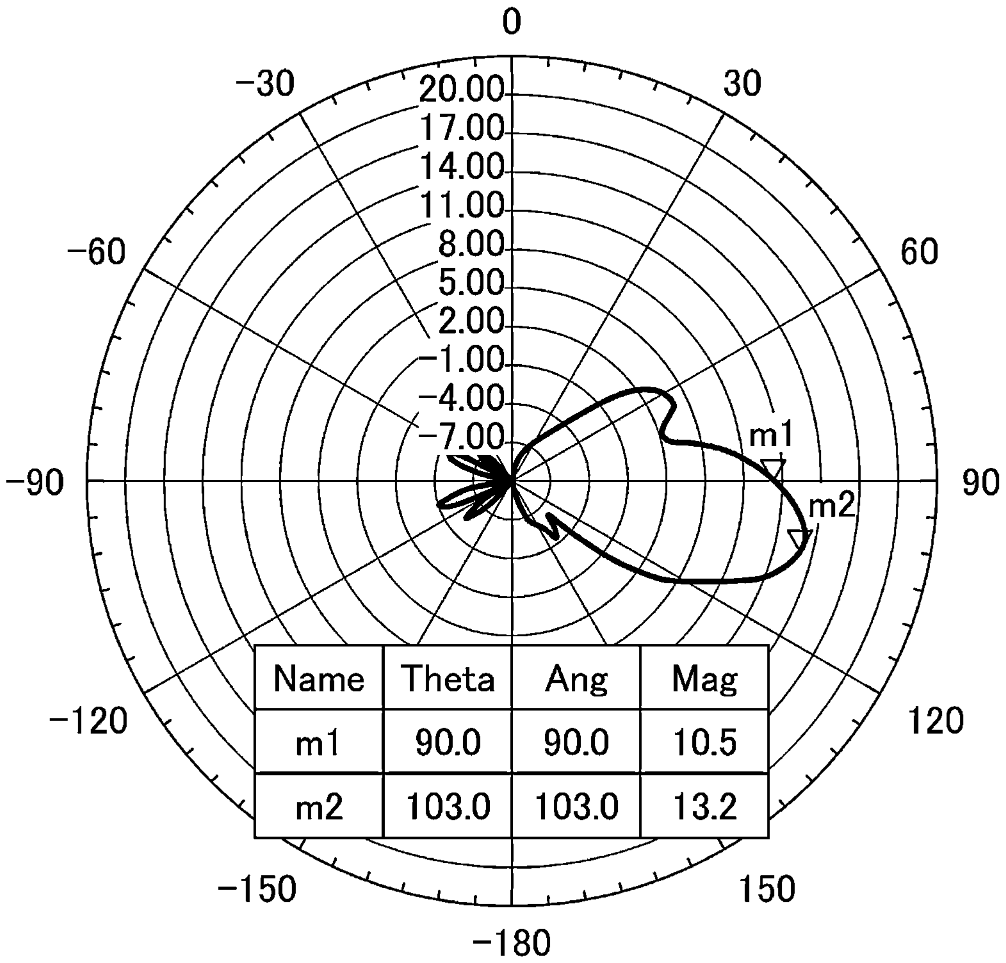
FIG. 6A illustrates simulation results for an emission pattern in the comparative antenna device.
Figure 6B:
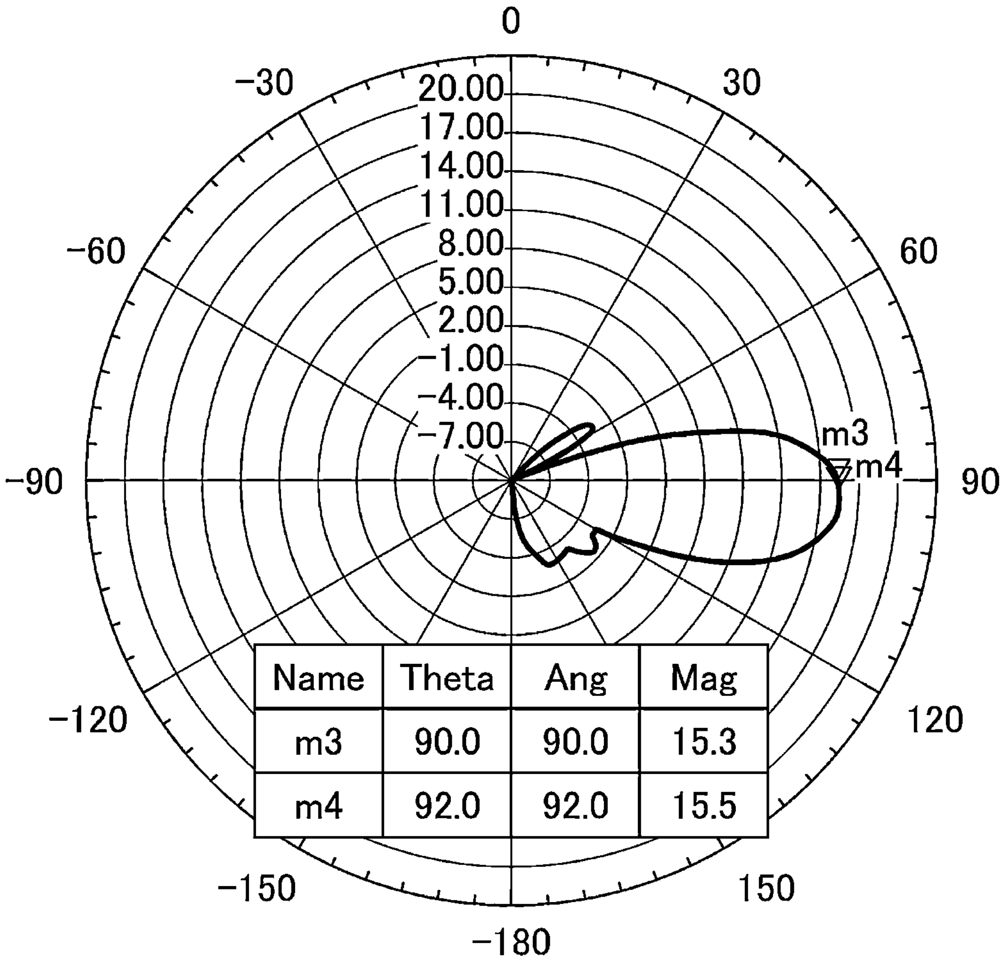
FIG. 6B illustrates simulation results for an emission pattern in the antenna device in accordance with one embodiment of the present invention.

FIG. 6A illustrates simulation results for an emission pattern (emission characteristic) in the comparative antenna device 10 (see FIG. 4C). FIG. 6B illustrates simulation results for an emission pattern in the antenna device 100 in the embodiment. In FIGS. 6A and 6B, directivity is indicated as an emission pattern on a YZ plane including the optic axis of the lens 130 (that is, the central axis C of the waveguide 110). A direction at an angle of +90 degrees is the +Y direction, which is the front direction. A direction at an angle of 0 degrees is the +Z direction.

In the emission pattern, illustrated in FIG. 6A, in the comparative antenna device 10, a gain in the front direction was 10.5 dBi and the direction in which the maximum gain was obtained was at an angle of 103 degrees. The direction at an angle of 103 degrees matched the direction indicated by the dash-dot line in FIG. 4C. In contrast to this, in the emission pattern, illustrated in FIG. 6B, in the antenna device 100 in the embodiment, a gain in the front direction was 15.3 dBi and the direction in which the maximum gain was obtained was at an angle of 92 degrees.

Thus, in the emission pattern in the antenna device 100 in the embodiment, the angle of the maximum gain direction in which the maximum gain was obtained was improved from 103 degrees to 92 degrees and the maximum gain was obtained substantially in the front direction, when compared with the emission pattern in the comparative antenna device 10. The gain in the front direction was also improved by 4.8 dBi, from 10.5 dBi to 15.3 dBi. A possible reason for the maximum gain direction approaching the +Y direction (that is, the front direction) is an effect obtained by canceling out a component with a large beam angle.

<Simulation Results for Emission Pattern (on XY-Plane)>

Figure 7A:
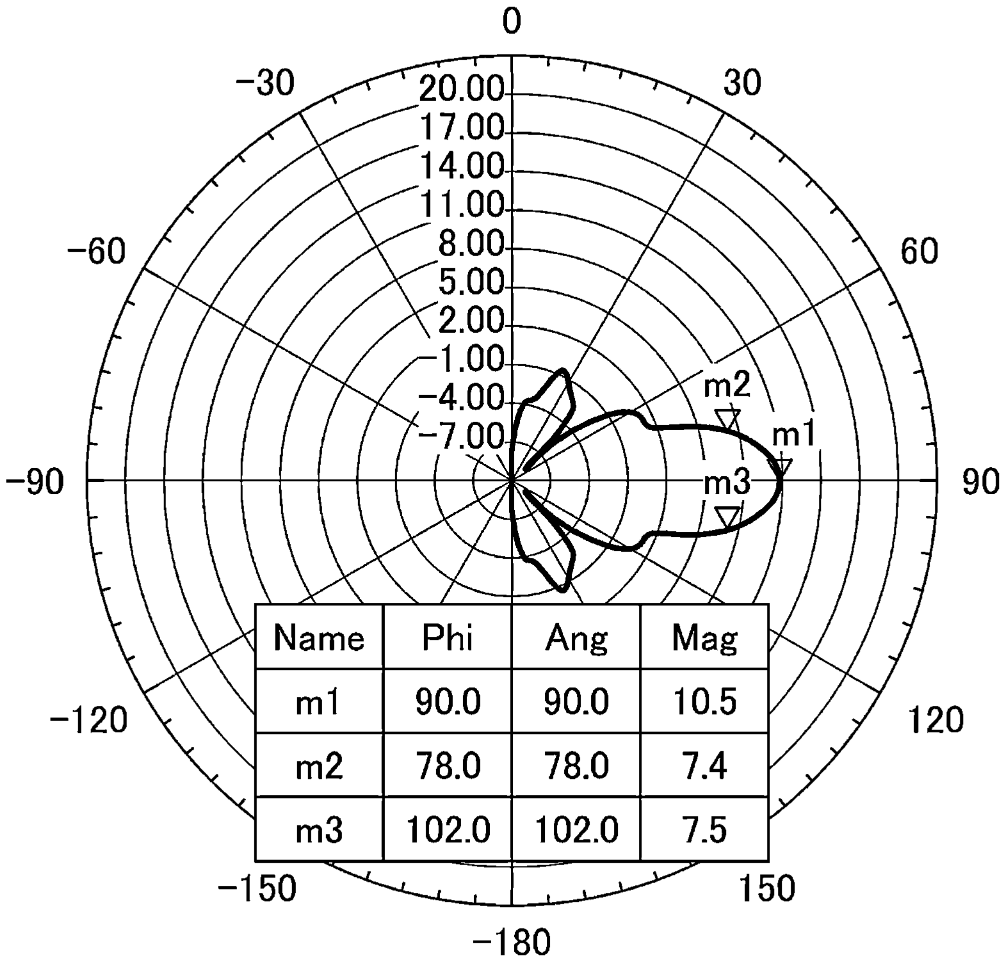
FIG. 7A illustrates simulation results for an emission pattern in the comparative antenna device.
Figure 7B:
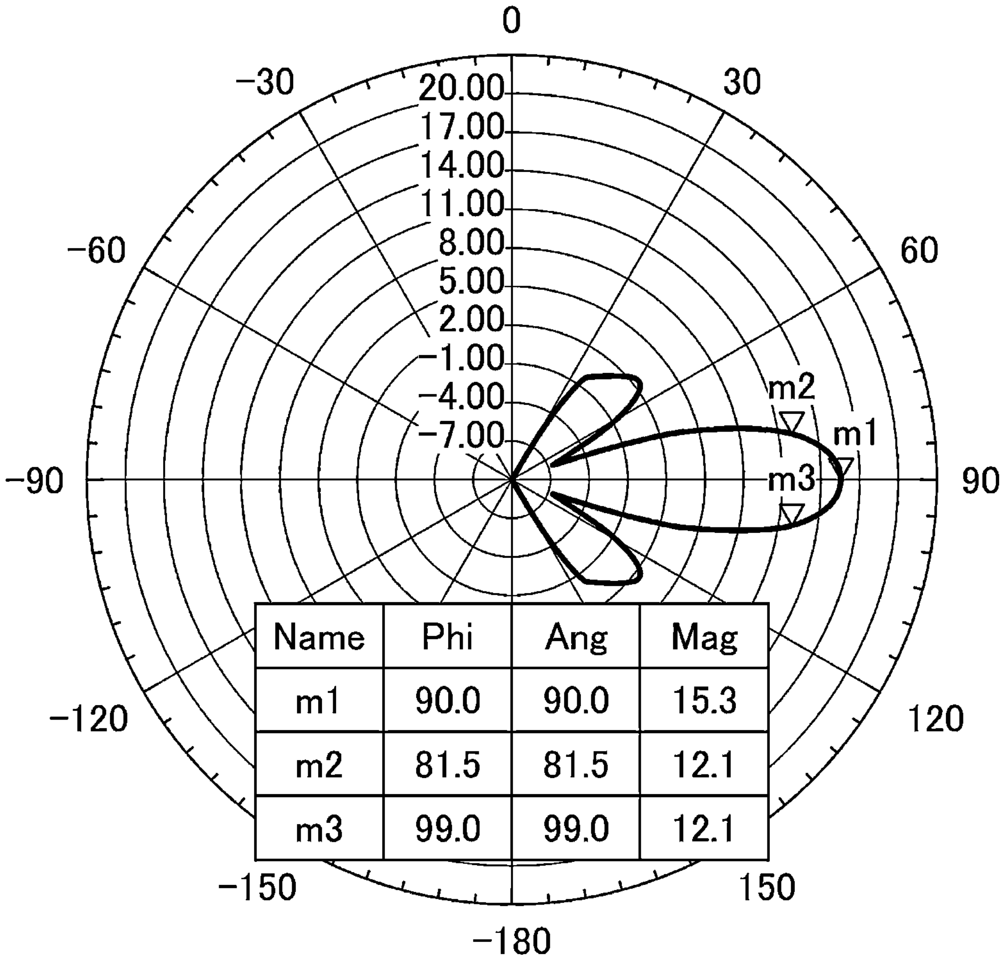
FIG. 7B illustrates simulation results for an emission pattern in the antenna device in accordance with one embodiment of the present invention.

FIG. 7A illustrates simulation results for an emission pattern in the comparative antenna device 10 (see FIG. 4C). FIG. 7B illustrates simulation results for an emission pattern in the antenna device 100 in the embodiment. In FIGS. 7A and 7B, directivity is indicated as an emission pattern on an XY plane including the optic axis of the lens 130 (that is, the central axis C of the waveguide 110). A direction at an angle of +90 degrees is the +Y direction, which is the front direction. A direction at an angle of −180 degrees is the +X direction.

In the emission pattern, illustrated in FIG. 7A, in the comparative antenna device 10, a gain in the front direction was 10.5 dBi, the gain being at point m1, and the 3-dB beam width was 24 degrees in the range from point m2 to point m3. In contrast to this, in the emission pattern, illustrated in FIG. 7B, in the antenna device 100 in the embodiment, a gain in the front direction was 15.3 dBi and the 3-dB beam width was 17.5 degrees in the range from point m2 to point m3.

Thus, in the emission pattern in the antenna device 100 in the embodiment, it was confirmed that the gain in the front direction could be improved by 4.8 dB from 10.5 dBi to 15.3 dBi and the 3-dB beam width could be reduced from 24 degrees to 17.5 degrees, when compared with the emission pattern in the comparative antenna device 10.

As described above, since the opening 111 has a larger opening area than the opening 112, a radio wave is reflected by the inner wall surface 110A toward the central axis C and is then canceled out with a direct wave for which the beam angle β (see FIG. 3) is large. In the structure in which the transmission antenna 120Tx and reception antenna 120Rx are placed with an offset from the optic axis of the lens 130, therefore, a radio wave passing the central portion of the lens 130 propagates without being canceled out, so a beam with a narrow beam width is obtained. This type of beam with a narrow beam width can be obtained in the waveguide 110 in which the opening 111 has a larger opening area than the opening 112. Conventionally, a waveguide that is large in opening size and length and has a large lens has been needed to reduce the beam width. With the antenna device 100 in the embodiment, however, the beam width can be reduced by use of the waveguide 110 in which the opening 111 has a larger opening area than the opening 112. The waveguide 110 of this type can be small-sized. Due to the small size of the waveguide 110, the lens 130 can also be small-sized. Therefore, the antenna device 100 in the embodiment can be greatly reduced when compared with the conventional antenna device.

Therefore, the antenna device 100, which is small and has a narrow beam width, can be provided. Even in the structure in which the transmission antenna 120Tx and reception antenna 120Rx are placed with an offset from the optic axis of the lens 130, the beam width can be reduced.

On a cross section of the waveguide 110 as taken along a YZ plane including the optic axis of the lens 130 (that is, the central axis C of the waveguide 110), the angle α between the optic axis of the lens 130 (that is, the central axis C of the waveguide 110) and the inner wall surface 110A of the waveguide 110 may be set to a predetermined angle by which the emitted electric field V1 and the emitted electric field V2 have mutually opposite phases: the emitted electric field V1 is at the propagation path Path1, through which a radio wave directly enters the lens 130 from the transmission antenna 120Tx; and the emitted electric field V2 is at the propagation path Path2, through which a radio wave emitted from the transmission antenna 120Tx is reflected by the inner wall surface 110A and then enters the lens 130. Therefore, a component for which the beam angle β (see FIG. 3) is comparatively large, the component is part of radio waves that directly enter the lens 130 from the transmission antenna 120Tx, can be canceled out with a reflected wave. As a result, the beam width of a beam emitted from the lens 130 can be effectively reduced. This is also true for reception by the reception antenna 120Rx.

The transmission antenna 120Tx and reception antenna 120Rx may be at the same position in the direction in which the optic axis of the lens 130 (that is, the central axis C of the waveguide 110) extends. The reception antenna 120Rx may be placed at a position at which the reception antenna 120Rx is point-symmetric to the transmission antenna 120Tx with respect to the optic axis when the opening plane of the opening 111 is viewed. In the structure in which the transmission antenna 120Tx and reception antenna 120Rx are placed with an offset from the optic axis of the lens 130, therefore, a match can be made in the emission characteristics between the transmission antenna 120Tx and the reception antenna 120Rx, and the distribution of the round-trip antenna gain can thereby be equalized with respect to the beam angle.

The position of the transmission antenna 120Tx and reception antenna 120Rx in the direction in which the optic axis of the lens 130 (that is, the central axis C of the waveguide 110) extends may match the focus position of the lens 130. Even in the structure in which the transmission antenna 120Tx and reception antenna 120Rx are placed with an offset from the optic axis of the lens 130, therefore, the transmission characteristics of the transmission antenna 120Tx and the reception characteristics of the reception antenna 120Rx can be made best.

On a cross section of the waveguide 110 as taken along a YZ plane including the optic axis of the lens 130, the angle α between the optic axis of the lens 130 (that is, the central axis C of the waveguide 110) and the inner wall surface 110A of the waveguide 110 is from 15 degrees to 45 degrees. Therefore, a direct wave component that passes a portion, of the lens 130, that is more on the outer side than is the central portion of the lens 130 can be canceled out, and a radio wave passing the central portion of the lens 130 propagates without being canceled out, so a beam with a narrow beam width can be obtained.

The waveguide path of the waveguide 110 may be hollow. Therefore, the antenna device 100, which is small and has a narrow beam width, can be provided with a simple structure in which the waveguide 110, which is hollow, is used.

The waveguide 110 may be in a truncated cone shape. Therefore, the antenna device 100, which is small and has a narrow beam width, can be provided with a simple structure in which the waveguide 110 in a truncated cone shape is used.

The lens 130 may be a convex lens. Therefore, the antenna device 100, which is small and has a narrow beam width, can be provided with a simple structure in which a convex lens is used as the lens 130.

<Antenna Device 100M in Modification of Embodiment>

Figure 8A:
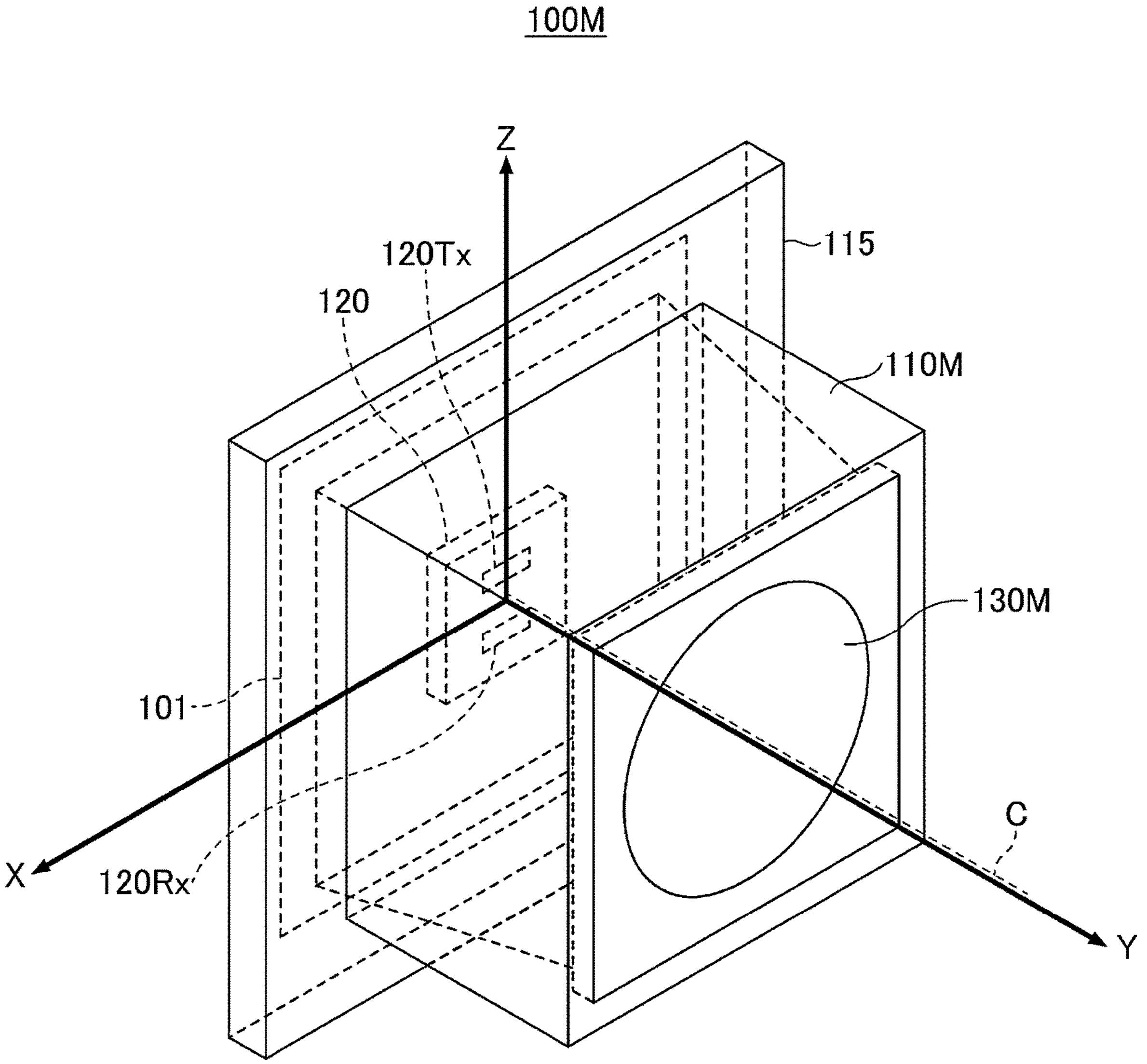
FIG. 8A illustrates an antenna device in a modification of the embodiment of the present invention.
Figure 8B:
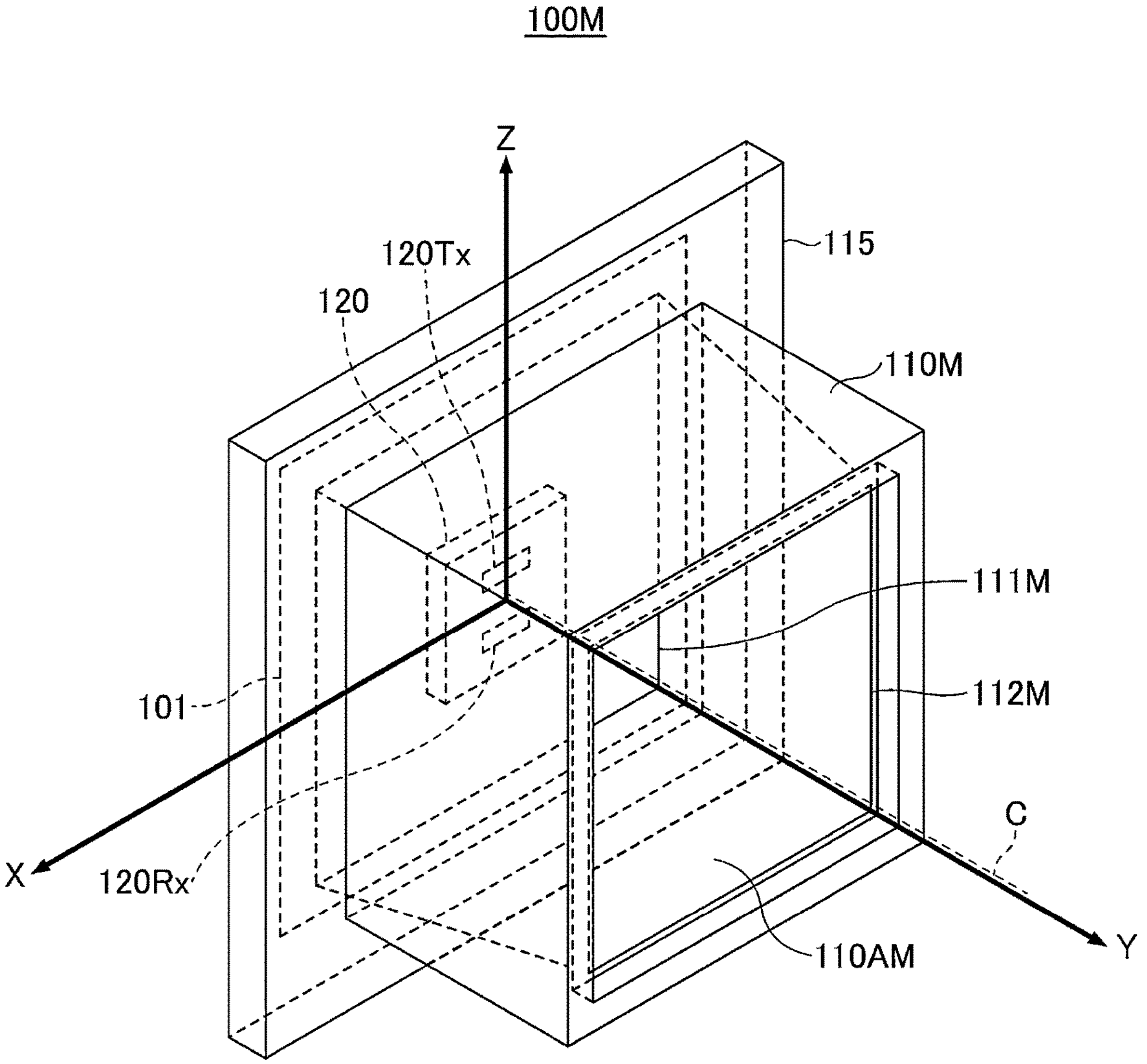
FIG. 8B also illustrates the antenna device in the modification of the embodiment.

FIGS. 8A and 8B illustrate an antenna device 100M in a variation of the embodiment. In FIG. 8B, a lens 130M is removed from the antenna device 100M in FIG. 8A. Constituent elements that are the same as in the antenna device 100 illustrated in FIGS. 1A and 1B will be given the same reference characters and descriptions will be omitted.

The antenna device 100M includes the substrate 101, a waveguide 110M, the transmission and reception section 120, and a lens 130M. The waveguide 110M, which is square, has an opening 111M on the Y-direction side, an opening 112M on the +Y-direction side, and an inner wall surface 110AM. The opening 111M is an example of the first opening. The opening 112M is an example of the second opening.

The opening 111M and opening 112M are square in plan view. The opening 111M has a larger opening area than the opening 112M. The waveguide 110M may be a square waveguide in a truncated pyramid shape. The inner wall surface 110AM has a shape similar to the shape of the outer surface in a truncated pyramid shape.

The lens 130M is a double-convex lens, which is square in plan view, resulting from extending the lens 130 illustrated in FIGS. 1A and 1B in plan view so as to form a square in plan view. The lens 130M can focus a radio wave as with the lens 130.

In the antenna device 100M as well, which includes the waveguide 110M implemented by a square waveguide as described above, a radio wave is reflected by the inner wall surface 110AM toward the central axis C and is then canceled out with a direct wave with a large beam angle, as in the antenna device 100. Therefore, a radio wave passing the central portion of the lens 130M propagates without being canceled out, so a beam with a narrow beam width is obtained. This type of beam with a narrow beam width can be obtained in the waveguide 110M in which the opening 111M has a larger opening area than the opening 112M. This eliminates the need for a large device.

Therefore, the antenna device 100M, which is small and has a narrow beam width, can be provided. Since the waveguide 110M is in a truncated pyramid shape, the antenna device 100M, which is small and has a narrow beam width, can be provided with a simple structure in which the waveguide 110M in a truncated pyramid shape is used.

<Dielectric Waveguide>

Figure 9:
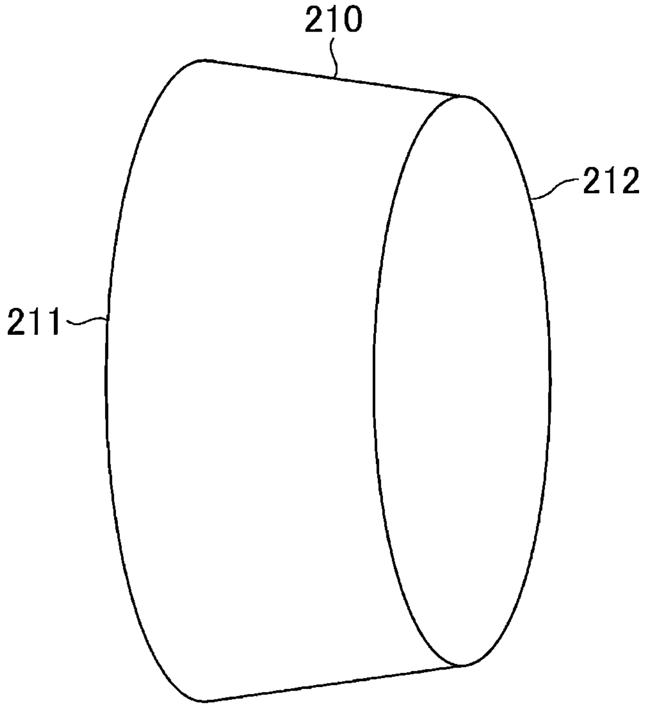
FIG. 9 illustrates a dielectric waveguide.

FIG. 9 illustrates a dielectric waveguide 210. The dielectric waveguide 210 is composed of a dielectric body, in a truncated cone shape, having an end face 211 and an end face 212. The dielectric body is formed from a resin material or the like, an example. The end faces 211 and 212 are circular in plan view. The dielectric waveguide path 210 may be used as an alternative to the waveguide 110 in the antenna device 100.

The end face 211, which is a flat surface, and the end face 212 is a concave surface matching the curved surface of the lens 130 on the −Y-direction side. The end face 211 has a larger area than the end face 212 in plan view. When the lens 130 is attached to the end face 212 of the dielectric waveguide 210 of this type, it is possible to propagate a radio wave as when the waveguide 110 is used. The dielectric waveguide 210 may be in a truncated pyramid shape.

<Modification of Lens>

Figure 10:
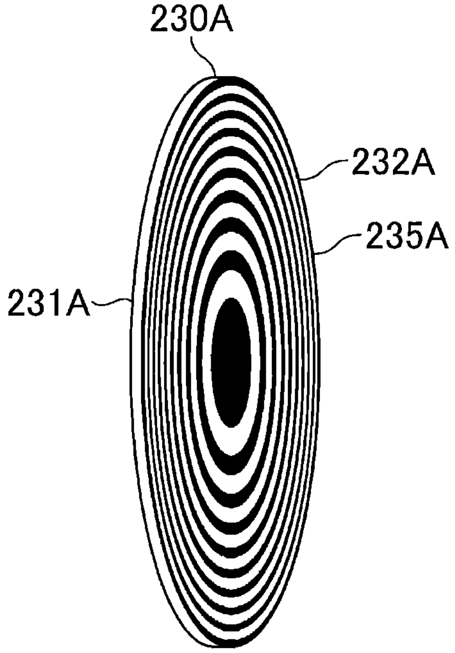
FIG. 10 illustrates a flat lens having a Fresnel zone.

FIG. 10 illustrates a flat lens 230A having a Fresnel zone 235A. The flat lens 230A, which is discoidal, is composed of a dielectric substrate in a plate shape. The flat lens 230A has flat end faces 231A and 232A at both ends of the dielectric substrate, one at each end. The Fresnel zone 235A is formed at the end face 232A of the flat lens 230A, composed of the dielectric substrate, on the +Y-direction side. The Fresnel zone 235A has a portion composed of a plurality of rings, illustrated in black, formed by a pattern of copper foils or the like, the rings blocking a radio wave, and also has another portion composed of a plurality of rings that lack a pattern of copper foils or the like and each of which is between two adjacent black rings and passes radio wave. The Fresnel zone 235A functions as a Fresnel lens that focuses a radio wave. When the flat lens 230A of this type is used as an alternative to the lens 130, it is possible to focus a radio wave as when the lens 130 is used. The Fresnel zone 235A may be disposed on the end face 231A on the −Y-direction side.

Therefore, an antenna device that is small and has a narrow beam width can be provided with a simple structure in which the flat lens 230A having the Fresnel zone 235A is used. The Fresnel zone 235A may be attached to the end face 211 or 212 of the dielectric waveguide path 210 illustrated in FIG. 9, instead of disposing the flat lens 230A having the Fresnel zone 235A.

This completes the description of the antenna device in an exemplary embodiment of the present invention. However, the present disclosure is not limited to specifically disclosed embodiments, but can be varied and modified in various other ways without departing from the scope of the claims.

What is claimed is:

1. An antenna device comprising:

a waveguide having a first opening on a first end, a second opening on a second end opposed to the first end;

a transmission antenna disposed in the waveguide at the first opening, the transmission antenna transmitting a transmission radio wave through the waveguide;

a reception antenna disposed in the waveguide at the first opening, the reception antenna receiving a reception radio wave through the waveguide; and a lens disposed in the wave guide at the second opening, the lens having an optical axis extending in a first direction, the transmission radio wave being emitted from the waveguide through the lens, and the reception radio wave coming into the waveguide through the lens;

wherein an area of the first opening is greater than that of the second opening, and wherein the transmission antenna and the reception antenna are placed with an offset from the optical axis of the lens.

2. The antenna device according to claim 1, wherein the waveguide has an inner wall surface inclining toward the optical axis of the lens from the first opening to the second opening, such that the transmission radio wave enters the lens through a first propagation path directly from the transmission antenna and a second propagation path after reflected by the inner wall surface, and wherein an inclination angle of the inner wall surface is set to a predetermined angle with respect to the optical axis in a cross section of the waveguide including the optical axis, such that a first emitted electric field of the transmission radio wave in the first propagation path and a second emitted electric field of the transmission radio wave in the second propagation path have mutually opposite phases at a plane perpendicular to the first propagation path and the second propagation path.

3. The antenna device according to claim 2, wherein the transmission antenna and the reception antenna are disposed at a same position in the first direction such that the transmission antenna and the reception antenna are point-symmetric with respect to the optical axis viewed from the first direction.

4. The antenna device according to claim 3, wherein the position in the first direction on which the transmission antenna and the reception antenna are disposed is a focal position of the lens in the first direction.

5. The antenna device according to claim 2, wherein the predetermined angle is greater than 0 degrees and equal to or smaller than 45 degrees.

6. The antenna device according to claim 1, wherein the waveguide has a hollow waveguide path.

7. The antenna device according to claim 1, wherein the waveguide has a dielectric waveguide path.

8. The antenna device according to claim 1, wherein the waveguide has a truncated cone shape or a truncated pyramid shape.

9. The antenna device according to claim 1, wherein the lens is a convex lens.

10. The antenna device according to claim 1, wherein the lens is a flat lens having a Fresnel zone or a flat lens including a meta-material.

* * * * *